Figure 1:
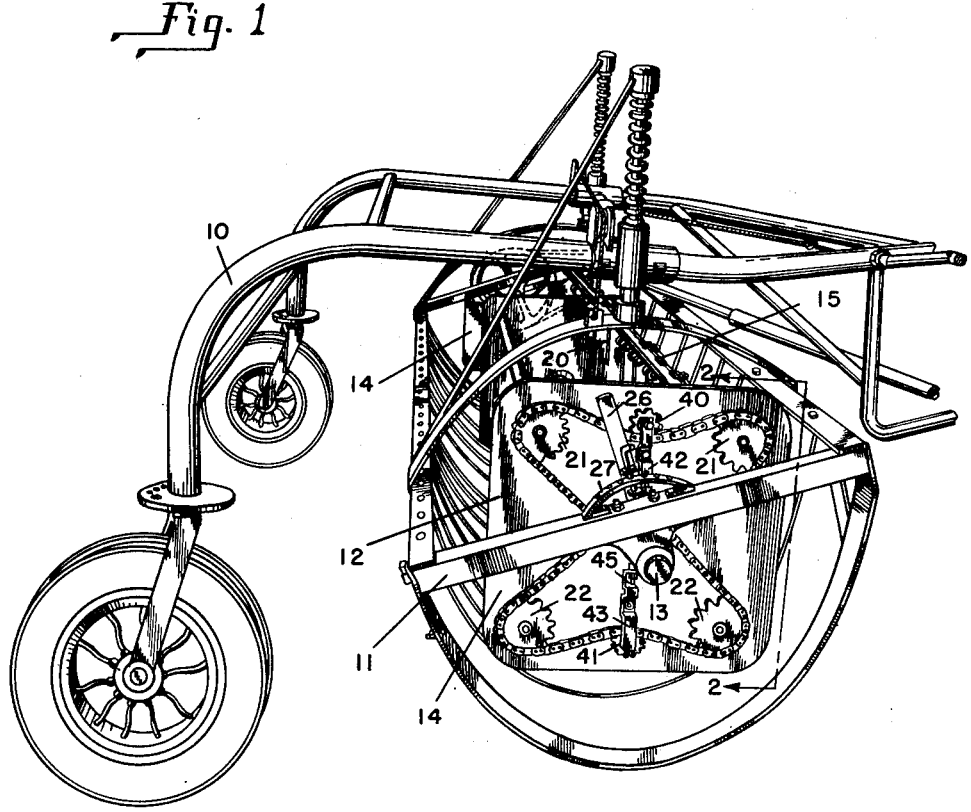

May 6, 1952   G. B. HILL   2,595,788
SIDE RAKE PITCH CONTROL MEANS
Filed Jan. 5, 1950

INVENTOR.
GEORGE B. HILL
BY
ATTY.

Patented May 6, 1952

2,595,788

UNITED STATES PATENT OFFICE 2,595,788

SIDE RAKE PITCH CONTROL MEANS

George B. Hill, New Holland, Pa., assignor to New Holland Machine Division of The Sperry Corporation, New York, N. Y., a corporation of Delaware Application January 5, 1950, Serial No. 136,900

2 Claims. (Cl. 56—377)

1

This invention relates to side rakes and more particularly to an improved form of pitch control for the rake teeth.

Various arrangements have been proposed in the past for controlling the pitch of the raking teeth of a side delivery rake, including the use of a sprocket chain drive which may be adjusted initially to set the pitch of the teeth and which is operative thereafter to produce a counter rotation of one revolution for every forward revolution of the raking or tedding reel. The present invention is concerned with a particular arrangement of the sprocket hook-up for more efficiently accomplishing the desired purpose in connection with a rotating raking reel having 2, 3, or more pairs of bars upon which the raking teeth may be mounted.

Basically, this invention contemplates the use of individual sprocket chains for each pair of bars, which chains also each cooperate with a relatively fixed pitch control sprocket. The sprocket wheels over which the chains are mounted, are carried at one end of each of the reel bars and the wheels including the fixed sprocket, are disposed in a triangular pattern. The chains are each trained over the sprocket wheels fixed to two of the adjacent reel bars and their complementary pitch controlling sprocket mounted concentrically with respect to the axle about which the reel rotates. The several chains are carried in driving relation over the sprockets on the moving reel bars and the complementary relatively stationary pitch sprockets that are integrally connected together. In this manner, a triangular drape of each of the sprocket chains results whereby not only will a shorter length of chain suffice than is now used in the conventional sprocket chain pitch control, but it has been found that the chains stand up better in use; and further, because of the greater degree of chain wrap around the sprocket wheels on the reel bars, there is less possibility for the chains to jump teeth on the sprockets as has sometimes happened in the past.

Figure 2:
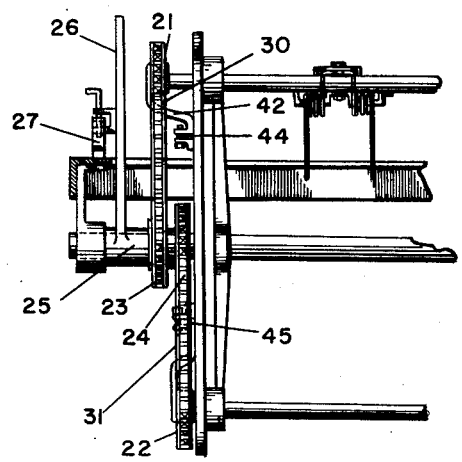

The preferred form of this invention is shown in the drawings wherein:

Figure 1 is a perspective view of a side rake assembly to which the present invention may be applied; and Figure 2 is a detailed side elevation of the rake teeth pitch control means taken on line 2—2 of Figure 1.

The details of this improved pitch control arrangement are shown in the drawings but it is to be noted that the mechanism may be built into any form of side rake having a rotating raking or tedding reel such as the one shown in Figure 1. This particular machine forms the subject of my U. S. Patent 2,518,303, granted August 8, 1950.

In this machine a main wheeled frame 10 supports a second frame or basket 11 that is adapted to carry the rotating reel 12. The reel 12 is carried on an axle 13 and has plates or spiders 14 at each end of the axle, that have suitable bearing means fixed thereto at the outer corners, which bearings are designed to carry a plurality of rotating rake teeth bars 15.

The reel may be rotatably driven from the power take-off of a tractor adapted to tow the side delivery rake through the field, and the power may be transmitted to the reel through suitable shafts and pulleys or sprockets, all as disclosed in my aforesaid Patent 2,518,303. This power is delivered to axle 13 of the reel to which the bearing plates 14 are fixed. The rake teeth bars 15 are rotatably mounted in the bearing means 14 which are keyed to the axle 13 and the bars have a plurality of spring tines or rake teeth 20 fixed thereto. With this construction, the bars and their teeth are driven around with the reel as it rotates whereby to either rake or ted the cut crop upon which the machine is being used.

The bars 15, at their ends opposite to the driven end of the reel, extend through the end bearing plate 14 and each bar 15 has a sprocket wheel fixed thereto which is used for the purpose of controlling the pitch of the rake teeth mounted on the bars, and also to effect a drive to rotate the bars whereby to accomplish a counter rotation of one revolution for the bars for every forward revolution of the reel. In the machine shown here, four bars 15 are provided and the sprocket wheels 21 on one of the adjacent pairs of bars are mounted in alignment and a second pair of aligned sprocket wheels 22 are mounted on the other pair of adjacent reel bars in offset relation with respect to sprockets 21.

A pair of complementary sprocket wheels 23 and 24 are rotatably mounted on the axle 13 of the reel, these sprockets being positioned in alignment with sprocket wheels 21 and 22 respectively. Sprocket wheels 23 and 24 are integrally fixed to a hub 25 and a lever 26 is fixed to the hub so that the sprockets 23 and 24 may be partially rotated around the axle 13 for adjusting their rotated position with respect to the reel and rake frame assembly. Suitable means including an arcuate keyway 27 integral with frame 11 may be provided to cooperate with the lever for locking it in a fixed position.

Sprocket chains 30 and 31 are draped around the two sets of sprocket wheels 21 and 23 and 22 and 24 respectively. It is to be noted that each of the sprockets follow a generally triangular pattern in their mounting over their sprocket wheels and a relatively long wrap of the chain is made around the driven pairs of sprocket wheels 21 and 22.

In some instances it may be desirable to provide a slack take up sprocket wheel to cooperate with each of the chains and for this purpose the wheels 40 and 41 have been provided. These wheels are slidably mounted with respect to the bearing plate 14, and are carried on suitable support brackets 42 and 43. The brackets hold the sprocket wheels 40 and 41 in contact with the outside of the outermost run of the chains 30 and 31 and may be adjusted inwardly to hold the sprocket chains tight, by means of the adjusting screws 44 and 45.

The structure described above operates in the conventional manner for accomplishing the raking or tedding action desired, and as the rake is pulled forwardly through the field, the reel is driven from the power supply provided by the tractor.

As the rake moves through the field, the reel is driven and the raking teeth sweep the field being worked upon. Assuming that the reel is driven to rake hay into a windrow, the reel rotates so as to sweep the hay into a pile before the rake, and as the rake moves on through the field, the pile is continuously delivered along the front side of the rake until it rolls off of the trailing end of the rake to complete the formation of a windrow.

As the reel rotates, the pitch control described above is operative to maintain the position of teeth 20 in the best position for sweeping the hay from the field. The sprocket wheels 23 and 24 are held stationary as above described by means of the locking of lever 26 at any one of a number of possible positions with respect to the arcuate keyway 27 which is fixed to the frame 11 of the machine. Before starting up the rake, and when the rake reel is stationary, the sprocket wheels 23 and 24 may be rotated forwardly or backwardly for a partial revolution to adjust the teeth to the desired pitch, and thereafter the teeth are held in this position as the reel rotates and chains 30 and 31 are caused to drive the sprocket wheels 21 and 22 by reason of their relative motion with respect to the fixed wheels 23 and 24. The arrangement is such that the bars 15 supporting the teeth are driven to rotate in an opposite direction to that of the reel and the relation of the drive teeth to the driven teeth on the sprocket wheels is such that the teeth bars are driven backwardly one revolution for every forward revolution of the rake reel.

In tedding, and although the reel rotates in the opposite direction, the parts cooperate in exactly the same manner whereby to cause the teeth to assume the best position for flipping the hay over without damaging the leafy structure of the crop so that a better cure can be obtained in the field.

In this application I have shown and described only the preferred embodiment of my invention simply by way of illustration of the practice of my invention as by law required. However, I recognize that my invention is capable of other and different embodiments and that the several details thereof may be modified in various ways, all without departing from the invention. Accordingly, the drawings and description herein are to be considered as merely illustrative of my invention and not as excluding other embodiments thereof.

I claim:

1. A side delivery rake having a rotating reel with two pairs of raking bars for supporting the raking teeth, said bars being rotatably carried in means that are in turn rotatably supported on an axle bearing fixed to the frame of the machine, and having means for controlling the pitch of said raking teeth through control of the rotative movement of said raking bars, consisting of pairs of aligned sprocket wheels fixedly mounted at the ends of each of said pairs of raking bars, and each of said pairs of aligned sprocket wheels being off-set with respect to each other, a pair of relatively stationary sprocket wheels supported generally concentrically with respect to said axle bearing, one of each of said last mentioned sprocket wheels being disposed in allignment with one of each of said pairs of alligned sprocket wheels respectively, and individual sprocket chains trained over each of the sets of aligned sprocket wheels, each set including the alligned sprocket wheels on a pair of raking bars and the respective alligned relatively stationary sprocket wheel.

2. A side delivery rake having a rotating reel with two pairs of raking bars for supporting the raking teeth, said bars being rotatably carried in means that are in turn rotatably supported on an axle bearing fixed to the frame of the machine, and having means for controlling the pitch of said raking teeth through control of the rotative movement of said raking bars, consisting of pairs of aligned sprocket wheels fixedly mounted at the ends of each of said pairs of raking bars, and each of said pairs of alligned sprocket wheels being off-set with respect to each other, a pair of relatively stationary sprocket wheels supported generally concentrically with respect to said axle bearing, one of each of said last mentioned sprocket wheels being disposed in allignment with one of each of said pairs of alligned sprocket wheels respectively, said stationary sprocket wheels being formed as an integral unit, means to fix said unit in any one of a number of selected positions, and individual sprocket chains trained over each of the sets of alligned sprocket wheels, each set including the alligned sprocket wheels on a pair of raking bars and the respective alligned relatively stationary sprocket wheel.

GEORGE B. HILL.

REFERENCES CITED

The following references are of record in the file of this patent:

UNITED STATES PATENTS

| Number | Name | Date |
|---|---|---|
| 1,926,538 | Hume et al. | Sept. 12, 1933 |
| 2,041,182 | Hume et al. | May 19, 1936 |